United States Patent [19]
Allison et al.

[11] Patent Number: 6,094,531
[45] Date of Patent: Jul. 25, 2000

[54] METHOD AND APPARATUS FOR AUTOMATICALLY INSTALLING OPERATING SYSTEMS MACHINES

[75] Inventors: Michael Allison, Fort Collins, Colo.; Fred Sprague, Beaverton, Oreg.; Richard W. Gillespie, Fort Collins, Colo.

[73] Assignee: Hewlett-Packard Company, Palo Alto, Calif.

[21] Appl. No.: 08/937,848

[22] Filed: Aug. 25, 1997

[51] Int. Cl.$^7$ ........................................ G06F 9/445
[52] U.S. Cl. ................................................ 395/712
[58] Field of Search ........................ 395/712, 200.5, 395/474, 828, 183.14

[56] References Cited

U.S. PATENT DOCUMENTS

| | | | |
|---|---|---|---|
| 5,307,497 | 4/1994 | Feigenbaum et al. | 713/1 |
| 5,421,009 | 5/1995 | Platt | 395/200.51 |
| 5,555,416 | 9/1996 | Owens et al. | 395/712 |
| 5,557,740 | 9/1996 | Johnson et al. | 395/183.14 |
| 5,655,148 | 8/1997 | Richman et al. | 395/828 |
| 5,666,293 | 9/1997 | Metz et al. | 395/200.5 |
| 5,699,428 | 12/1997 | McDonnal et al. | 380/4 |
| 5,715,463 | 2/1998 | Merkin | 395/712 |
| 5,717,930 | 2/1998 | Imai et al. | 395/712 |
| 5,724,530 | 3/1998 | Stein et al. | 345/329 |
| 5,835,911 | 11/1998 | Nakagawa et al. | 707/203 |
| 5,860,012 | 5/1997 | Luu | 395/712 |
| 5,867,501 | 6/1995 | Horst et al. | 370/474 |

OTHER PUBLICATIONS

Title; Helping Make the Move to Solaris 2.x: Here are some tips for Sun systems administrators as users face the inevitable, source: Open Systems Today, Sep. 27th, 1993.

Title: Windows 95 Debuts, source: Multimedia & Videodisc Monitor, (Sep. 1st, 1995).

Title: On technology's New Client Management Solution Lowers Labor Cost for Enterprise PC Management, Source: PR Newswire, (Jul. 21st, 1997).

Title: Ignite/UX>> The Series. (HP/UX's Ignite/UX's Ignite automatic application installer), (Nov, 1998).

*Primary Examiner*—Tariq R. Hafiz
*Assistant Examiner*—Chambli C. Das

[57] ABSTRACT

The present invention provides a method and apparatus for automatically installing an operating system on a computer via a serial port of the computer. An installer machine running an installation program connects to the computer to be installed via a serial port of the computer to form an ASCII connection with the computer. Once the connection is made, the installation program sends commands to the boot ROM of the computer to institute the installation process. The computer program then waits for configuration questions to be asked by the boot ROM of the computer and sends the appropriate answers to the questions. Preferably, the installer is connected to the machines to be installed via a multiplexer/demultiplexer device which is connected to the serial ports of the machines to be installed. Thus, the installer is capable of installing operating systems on a plurality of machines by selecting the port number of the multiplexer/demultiplexer device to which the machine to be installed is connected. The installer receives requests to install operating systems on one or more of the machines. The requests indicate which machine is to be installed and the type of operating system to be installed. The installer then sends a command to a machine to be installed which causes the machine to go into its boot ROM. The installer selects a script needed for installing the paraticular type of operating system. The installer then sends a series of installation commands to the computer in response to the series of questions output to the installer by the boot ROM of the computer. Preferably, the installer is incorporated into an automated testing system to allow operating systems to be automatically installed on a plurality of test machines over a network. The automated testing system is capable of being distributed over a network, such as the Internet, and is used for testing hardware and software.

18 Claims, 5 Drawing Sheets

METHOD AND APPARATUS FOR AUTOMATICALLY INSTALLING OPERATING SYSTEMS MACHINES

TECHNICAL FIELD OF THE INVENTION

The present invention relates to a method and apparatus for automatically installing operating systems on machines and, more particularly, to a method and apparatus which allows an operating system to be automatically installed on a machine from a remote location over a network through a serial port of the machine.

BACKGROUND OF THE INVENTION

Typically, an operating system (OS) is installed on a computer by an operator sitting at the console of the computer who types in data on a keyboard in response to questions output to the computer display by the boot ROM of the computer. This process is tedious and generally unsuitable for installing operating systems on large numbers of computers. Another known method of installing operating systems on computers involves manually configuring files on a server which tells the server exactly how to install operating systems on specific computers which are in communication with the server via a local area network (LAN). This method requires that an operator go to the computer being installed and enter instructions on the console instructing the computer to boot from a specific machine and install an OS. The operator then must type in responses to certain start-up questions output to the display. Once these steps are completed, the remainder of the installation process is accomplished automatically by the server.

One disadvantage of the known installation methods is that operator intervention is required. Operator intervention increases the installation time as well as the likelihood that an error will occur during the installation process. Another disadvantage of using the server to install the computers on the LAN is that the server must contain a specifically-configured file for each machine to be installed, which makes the method impractical for installing large empires, e.g., ten or more machines.

Accordingly, a need exists for a method and apparatus for automatically installing operating systems on computers which does not require human involvement and which is capable of automatically installing operating systems on large numbers of computers. Automatic OS installation without human involvement would be particularly advantageous in automatic testing systems where users operating workstations schedule tests on test machines which are located remotely with respect to the user's workstation and which are connected to the workstations via a network. Automatic OS installation in this environment would allow a new OS to be automatically loaded on a test machine so that a test to be executed which requires an OS different from the OS currently running on the test machine could be processed by the test machine once the correct OS has been installed. Although automatic testing systems are known, the known automatic testing systems only have the capability of re-booting test machines and do not have the capability of automatically installing an OS on a test machine.

For example, Sun Microsystems, Inc. has proposed an automated task-based scheduler for use with UNIX platform systems which uses scripts to allow users operating "client" machines to schedule tests to be executed on "target" machines. A central server receives a request from a client machine to perform a task. The server maintains information relating to all currently scheduled tasks on all target machines in a "status" database. The server maintains information relating to the expected duration of each test package and other test package attributes in a "packages" database. When the server receives a request to perform a task from a client machine, the server determines the loads on each of the target machines based on the expected duration of each test package and then schedules the task on the target machine with the least current load. A task file created at the client machine and copied to the server includes priority information relating to the task requested by the client machine. The target machine selects a task to be performed based on this priority information. Once a task is completed, the results are copied back to the server which compares them to a set of "golden results" and creates a comparison report which is mailed back to the user that requested the test.

One disadvantage of the system proposed by Sun Microsystems is that no provision is made for loading a new operating system on a target machine. Rather, a test is only scheduled on a target machine which has the appropriate OS already installed on it. Therefore, if a target machine with the appropriate OS is not available when a test needs to be executed, the test cannot be executed until a target machine having the appropriate OS is available to execute the test.

Therefore, a need exists for a method and apparatus which will enable an OS to be automatically installed on a test machine in an automated testing system without the need for human involvement during the installation process.

SUMMARY OF THE INVENTION

In accordance with the present invention, a method and apparatus is provided for automatically installing an operating system on a computer via a serial port of the computer. To accomplish this, a computer program connects to the console of the computer to be installed via the serial port of the computer to form an ASCII connection with the computer. Once the connection is made, the computer program sends commands to the boot ROM of the computer to initiate the installation process. The computer program then waits for configuration questions to be asked and sends the appropriate answers to the questions.

The apparatus of the present invention which accomplishes the installation process is referred to hereinafter as the installer. Preferably, the installer is connected to the machines to be installed via a multiplexer/demultiplexer device which is connected to the RS-232 ports of the machines. Thus, the installer is capable of installing operating systems on a plurality of machines. The installer receives requests to install operating systems on one or more machines. The installer then sends a command to a machine to be installed which causes the machine to go into its boot ROM. The machine is identified by the port number of the multiplexer/demultiplexer to which the particular machine is connected. The installer then sends a command to the machine indicating that the installer is going to install an OS on the machine. The boot ROM of the machine then causes a series of questions to be sent to the installer to which the installer replies with appropriate responses to cause an operating system to be installed on the machine.

In accordance with the preferred embodiment of the present invention, the installer is incorporated into an automated testing system to allow operating systems to be automatically installed on a plurality of test machines over a network. The automated testing system is capable of being distributed over a network, such as the Internet, and is used for testing hardware and software. A communications protocol is provided to allow components of the system to communicate with each other with maximum efficiency and flexibility. A plurality of users operating computers, or workstations, interface to the automated testing system via user interfaces. Each user interface displays test parameter choices to the user from which the user may select test parameters relating to a software or hardware test to be performed. Each user interface generates data packets in response to selections from the user and outputs the data packets onto the network.

Generally, when a user selects a job to be performed, a submit-job data packet is output from the user interface which comprises information relating to the job to be performed. A dispatcher machine located on the network receives the submit-job data packet and updates a list of tests to be performed. A plurality of test machines are in communication with the dispatcher machine via the network. In response to receiving the submit-job data packet, the dispatcher machine generates work-available packets and sends them to the test machines which are capable of performing the submitted job. These work-available packets wake up the test machines which receive them so that the test machines, if available, can request work. When a test machine is available, the available test machine generates availability data packets which indicate that the test machine is available to perform a test. These availability data packets are sent over the network to a dispatcher machine.

Upon receiving an availability data packet, the dispatcher machine determines whether one or more of the tests on the list of tests maintained by the dispatcher machine are capable of being performed by the test machine which generated the availability data packet. If one or more of the tests listed are capable of being performed by the available test machine, the dispatcher machine determines whether any of the tests contained on the list of tests maintained by the dispatcher machine are capable of being performed on the available test machine and, if so, prioritizes these tests and instructs the available test machine to perform the test having the highest priority. The test machine then performs the test. Preferably, the test machine obtains the test and any archives associated with the test to be performed from a library which is in communication with the user interfaces and with the test machines via the network. However, the test can be obtained from any location which is in communication with the network.

Each test machine has a launcher program installed thereon which provides the interface between the test machines and the dispatcher machine and between the library and the test machines. The launcher program is responsible for preparing the test machine to execute a test, obtaining the test and any archives associated with the test from the library or from some other location on the network, installing the test and any associated archives on the test machine, preparing the test and archives to be executed, causing the test machine to execute the test, and outputting the results of the test to a predetermined location. The results of the tests are output to the dispatcher machine. The users can query the dispatcher machines via the user interfaces to obtain status information about the tests.

In order to process a test on a test machine, it may be necessary to configure boot ROM settings on the test machine and/or install a new operating system on the test machine. The installer is in communication with the dispatcher machines via the network. The installer receives an instruction from a dispatcher machine indicating that a particular test machine is to be reconfigured and/or have an operating system installed on it. In response to receiving the installation instruction, the installer calls a computer program which causes the test machine to be reconfigured and/or installed via the RS-232 port of the particular test machine. In accordance with the preferred embodiment of the present invention, the program is a script-driven interpreter which establishes a connection to the console of the test machine and then processes commands from a script to cause a test machine to have an operating system installed on it.

Once the test machine has been reconfigured and/or installed, the launcher program and any other necessary software is installed on the test machine. When the launcher program is installed, the launcher program will notify all of the dispatcher machines with which it is allowed to communicate that the test machine is on the system. The notified dispatcher machine will then update a machines file contained in the dispatcher machine with information relating to the test machine, such as the address of the test machine, its hardware configuration, which users are allowed to use the test machine, which type of OS is running on the machine, and whether the machine can have its boot ROM reconfigured and/or have a new operating system installed on it.

DETAILED DESCRIPTION OF THE INVENTION

Figure 1:
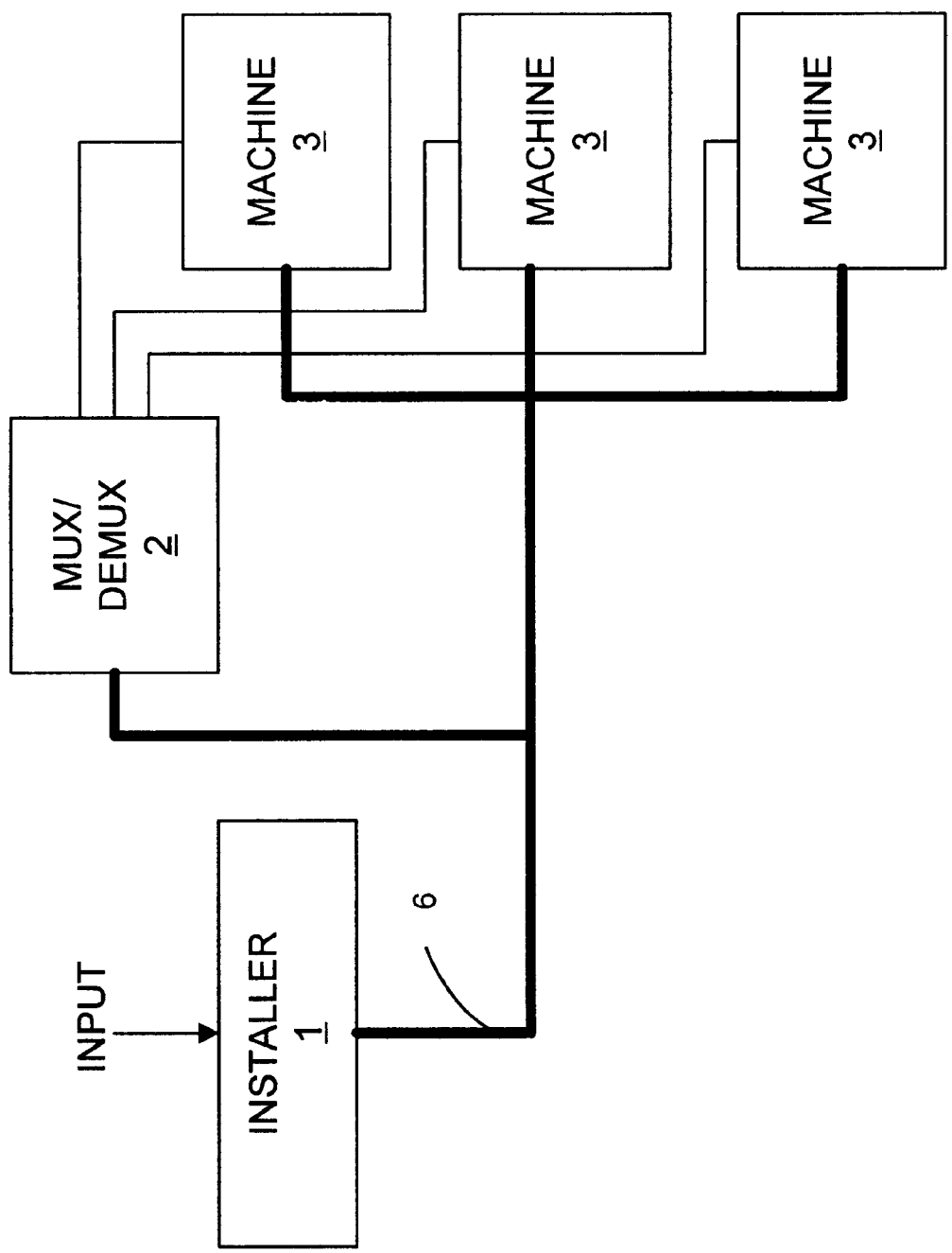
FIG. 1 is a block diagram functionally illustrating the connections on a network between the installer of the present invention and several computers.

FIG. 1 is a block diagram which illustrates the installer of the present invention. The installer 1 of the present invention is capable of configuring several machines 3 and installing operating systems on them, either individually or simultaneously. The installer 1 and the machines 3 are in communication with one another over network 6, which, in accordance with the preferred embodiment, is the Internet. The machines 3 preferably interface with network 6 via multiplexer/demultiplexer 2. However, alternatively the installer 1 may interface with the machines 3 over the network 6 through a connection to the LAN ports of the machines 3 such that the multiplexer/demultiplexer 2 is unnecessary.

When installer 1 receives a command to install an operating system on one of the test machines 3, the installer 1 sends a command to the IP address of the multiplexer/demultiplexer 2, along with the port number of the multiplexer/demultiplexer 2 to which the machine is connected. The installer 1 is connected to the RS-232 ports of each of the machines 3 via multiplexer/demultiplexer 2. Multiplexer/demultiplexer 2 provides two-way communications between the machines 3 and the installer 1.

The installer 1 may be any type of machine which is capable of running the installation program of the present invention. The installation program must be capable of receiving ASCII patterns from the machines 3 being installed, recognizing the ASCII patterns received, and generating an appropriate ASCII pattern response. Since different types of machines 3 may send different ASCII patterns, the installation program must be capable of recognizing the various patterns and generating appropriate ASCII responses to the patterns received. The ASCII pattern response generated by the program for a given pattern received may be different for different OS revisions. Also, the ASCII patterns received by the installer 1 and the ASCII patterns generated in response to the patterns received may be different for different machines, even if the OS revision being installed is the same for all of the machines being installed. The installation program must be capable of handling all of these situations. The installation program which accomplishes these tasks can be designed and implemented in a variety of different ways. It will be apparent to those skilled in the art the manner in which a suitable installation program can be designed and implemented to accomplish these tasks.

In accordance with the preferred embodiment, the installation program is implemented as an interpreter for a new programming language. The installation program uses a plurality of scripts written in that new programming language to install operating systems on machines 3. The installer 1 selects a script to be used to install an OS in accordance with preselected criterion when a request to install an OS is received by the installer 1. The preselected criterion may correspond to, for example, the type or identity of machine to be installed and/or the OS revision to be installed. The scripts process the ASCII patterns received by the interpreter and generate appropriate ASCII responses which are sent by the interpreter to the machine being installed. The programming language allows for the recognition of the ASCII patterns received by the installer 1, the sending of an appropriate ASCII response to the machine being installed, the repetition of one or more of these actions, and the execution of actions conditionally. It will be apparent to those skilled in the art the manner in which the programming language, the interpreter and the scripts can be designed and implemented to accomplish these tasks.

In accordance with the preferred embodiment, when the installer 1 receives a request to install a particular machine 3, the installer is provided with the name of the machine 3 as well as the OS revision to be installed. The request causes the correct script to be selected. The script then sends a command in ASCII to multiplexer/demultiplexer 2 which includes the port number of the multiplexer/demultiplexer 2 to which the particular machine 3 to be installed is attached. The command causes the machine 3 being installed to go into its boot ROM and initiate the installation process. The installation process then causes a series of questions to be output to the multiplexer/demultiplexer 2 via the RS-232 port of the machine 3. The multiplexer/demultiplexer 2 outputs the questions over the network 6 to the installer 1. In response to each question output by the machine 3 being installed, the installer 1 sends an ASCII answer to the machine 3, thereby causing the operating system to be installed on the machine 3.

It should also be noted that although only one installer 1 is shown in FIG. 1, several instances of installers 1 and multiplexers/demultiplexers 2 may be implemented on the same network 6 for installing operating systems on a large number of machines 3. Also, although only three machines 3 are depicted in FIG. 1 as being installed by the installer 1, the present invention is not limited with respect to the number of machines 3 which can be installed by a single installer 1. Furthermore, although the installation program preferably utilizes the multiplexer/demultiplexer 2 to install an OS on a machine 3, the installation program is capable of using any method and/or apparatus for installing an OS on a machine 3. For example, the installation program can also use HP Ignite-UX™ to install an operating system on a machine 3 via the LAN port of the machine 3. Also, the installer 1 of the present invention can be expanded and/or upgraded by altering the installation program, as will be understood by those skilled in the art.

Figure 2:
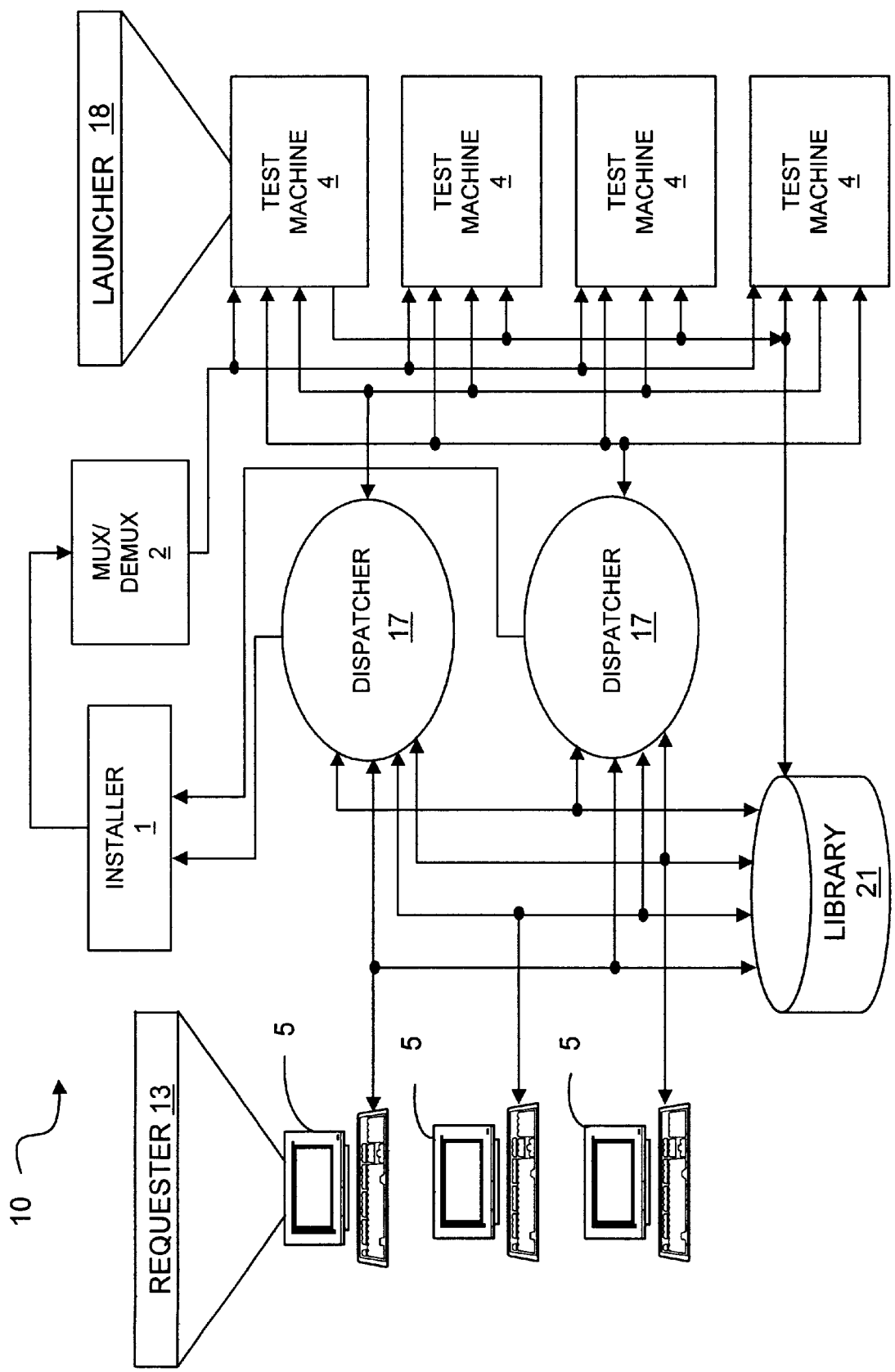
FIG. 2 is a block diagram functionally illustrating the installer of the present invention shown in FIG. 1 incorporated into an automated testing system.

The operations and functionality of the installer 1 of the present invention, as implemented in the context of a distributed network in conjunction with an automated testing system, will now be discussed with respect to FIGS. 2–5. FIG. 2 illustrates a functional block diagram of an automated testing system 10 incorporating the installer 1 of the present invention. The lines interconnecting the components of the automated testing system 10 are intended to functionally illustrate communication among the components of the system and do not necessarily represent physical connections. The system 10 is capable of being distributed over a network, such as the Internet. The lines shown in FIG. 2 are merely intended to represent communication over the network.

Generally, the automated testing system 10 allows users (not shown) operating computers 5 to test software and hardware on test machines 4. When hardware is being tested, the hardware will be comprised by the test machines 4, whereas when software is being tested, the software will be installed on the test machines 4. Since the operations of the system 10 are essentially the same for testing both hardware and software, in the interest of brevity, the operations of the system of the present invention will be discussed only with respect to software testing.

The users interface with the automated testing system 10 via requesters 13, which preferably are graphical user interfaces (GUIs). In accordance with the preferred embodiment of the present invention, each user computer 5 will contain a requester 13 which will provide the user with a graphical display format from which the user can select specifics regarding software tests to be performed from a list of menu items displayed on a display screen. Users located remotely with respect to the automated testing system may have access to and communicate with the automated testing system to perform testing via a network which may be, for example, the Internet. Also, the individual components of the automated testing system 10, such as the dispatchers 17, test machines 4 and libraries 21, may be separated and distributed over the network.

An ASCII-based communications protocol preferably is used for communicating information between users and the automated testing system as well as between the components of the automated testing system. The ASCII-based communications protocol of the present invention generates packets which contain instructions and data. These packets are framed using the well known Transmission Control Protocol Over Internet Protocol (TCP/IP). These frames are then transmitted between the user computers 5 and the automated testing system 10 and between the components of the automated testing system 10 over the Internet.

The users are in communication with dispatchers 17 via requesters 13. Generally, when a job is to be executed the requesters 13 send requests to the dispatchers 17. The dispatchers 17 then assign a priority to the job in view of other jobs they have already received. The dispatchers 17 then determine whether there are test machines 4 capable of performing the job that are not already executing other jobs and that are running the correct operating system for performing the job. If there are, the dispatcher 17 sends a message to the launchers 18 running on those test machines 4 which tells those test machines 4 to wake up and request work. The launcher 18 is a program installed on the test machine 4 which constitutes the interface between the test machine 4 and the other components of the automated testing system.

Once these test machines 4 have been awakened, the launchers 18 of the test machines 4 notify the dispatchers 17 whenever they are available for job execution by sending "available" packets to the dispatchers 17. Generally, these available packets function as the clock of the automated testing system 10 for triggering state changes within the automated testing system. When a dispatcher 17 receives an available packet from a launcher 18 of a test machine 4, it looks at a list of jobs waiting to be executed, determines which of those jobs can be executed on the available test machine 4, prioritizes the jobs which can be executed on the available test machine, and then sends the job with the highest priority to the available test machines 4. Therefore, a job is only submitted to a test machine 4 in response to receipt by the dispatcher 17 of a request for work from the test machines 4, i.e., in response to receiving an available packet.

If upon receiving a request to perform a job, the dispatcher 17 determines that there are no test machines 4 capable of performing the job which are not already performing jobs, or that there are no test machines 4 capable of performing the job which have the correct operating system already installed on them, the dispatcher 17 will determine which of the test machines 4 capable of performing the job is executing the lowest priority job. Generally, the lowest priority job is temporarily suspended to allow the higher priority job to be executed. If there is no lower priority job already being executed by a test machine 4 capable of performing the job, the dispatcher 17 will determine which test machines 4 are allowed to have operating systems installed on them and, of those, which are capable of performing the job. The dispatcher 17 then awakens those test machines. When those test machines 4 become available, the launchers 18 of those test machines 4 send available packets to the dispatcher 17. Upon receipt of an available packet, the dispatcher 17 prioritizes the jobs which can be executed on the test machine which sent the packet, causes an operating system to be installed on the test machine, and then sends the highest priority job to the test machine. The interaction between the launchers 18 of the test machines 4 and the dispatchers 17 is discussed in detail below with respect to FIG. 5.

When a requester 13 receives a request from a user computer 5, the requester 13 determines whether the user has permission to obtain the test requested and, if so, provides a list of tests and associated archives to the user computer 5. The user then selects one or more of the tests and archives. The requester 13 then sends the corresponding test names, along with the user's ID, to the dispatcher 17. The dispatcher 17 goes through the process discussed above of awakening test machines capable of performing the job and, upon receiving an available packet from the launcher 18 of a test machine, prioritizes the jobs which can be executed on the test machine and then sends an "execute-job" command to the test machine 4. The launcher 18 running on the test machine 4 receives the "execute-job" command and then obtains the test and any associated archives from the library 21, prepares the test machine 4 to execute the test, and causes the test machine 4 to execute the test. Once the test machine 4 has completed the test, the launcher 18 forwards the results of the test to the dispatcher 17 which then notifies the user via the requester 13 that the test results are available. The user then obtains the test results from the dispatcher 17 via the requester 13. Alternatively, the results of the test can be saved in a database (not shown) outside of the dispatcher 17. In this case, the user will obtain the test results from that database via the requester 13.

As stated above, preferably the components of the automated testing system and the users thereof communicate via the Internet. In order to accomplish this, instructions and data are encapsulated in packets in accordance with an ASCII-based communications protocol and then these packets are framed in accordance with the TCP/IP protocol and sent over the Internet. Therefore, each user of the automated testing system will have the ASCII-based communications protocol of the present invention as well as a TCP/IP utility installed on his or her computer 5 to allow users to receive and transmit the automated testing system packets. Similarly, each component of the automated testing system 10, such as the dispatchers 17 and test machines 23, will have the ASCII-based communications protocol as well as a TCP/IP utility installed thereon to allow each component to receive and transmit the automated testing system packets.

Figure 3:
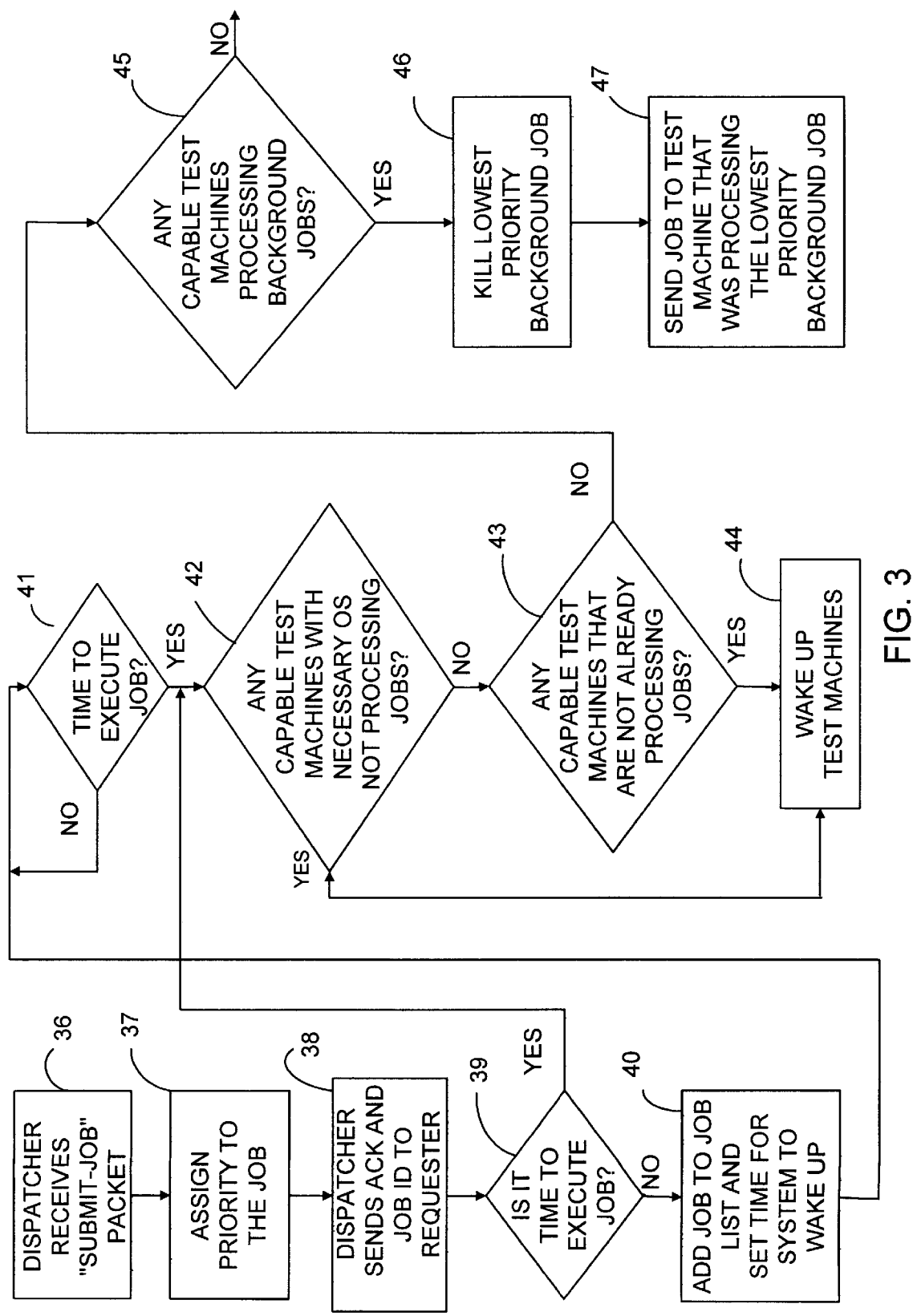
FIGS. 3 and 4 are flow charts demonstrating the scheduling method implemented with the automated testing system illustrated in FIG. 2.

FIG. 3 is a flow chart depicting the prioritization aspect of the scheduling method used with the automated testing system. It is preferable to process a job on a test machine which is already running the appropriate operating system, rather than change the operating system running on a test machine. In accordance with the embodiment shown in FIG. 3, steps are taken to send a job to a test machine which is already running the appropriate operating system and job priority levels are used to select a test machine. In accordance with the preferred embodiment of the present invention, one of several priority levels may be assigned to a job from a highest priority level to a lowest priority level. The highest priority level preferably is assigned to the system administrator to allow the system administrator to access the automated testing system at the highest priority. The lowest priority level is the "background" priority level, which is assigned to jobs which are to be executed only if no other jobs are available to be executed. It will be apparent to those skilled in the art that the priority levels can be assigned in any desired manner.

Preferably, each job submitted in the "background" category is appended into a queue (not shown) and will be executed until removed. Within the "background" priority level, preferably three levels exist. Of these three levels, the upper level corresponds to dispatched background jobs that will be allowed to complete once they have been dispatched. The next level corresponds to dispatched background jobs which should quit when a higher priority job is available for the test machine and no other test machines are available to execute the higher priority job. The next level corresponds to dispatched background jobs which should be killed when a higher priority job is available for the test machine and no other test machines are available to execute the job. The difference between jobs which quit and those which are killed is that the results of the jobs which are quit are preserved and the job is resumed once the higher priority job is completed, whereas a job that is killed is not resumed but rather is placed back in the queue to be performed at a later time.

Once a job is submitted to the dispatcher 17, the job is prioritized. When the requester 13 submits a job to the dispatcher 17, the requester 13 sends a "submit-job" packet to the dispatcher 17. The dispatcher 17 receives the "submit-job" packet, as indicated at block 36. The "submit-job"

packet contains the name and IP address of the requester 13 and information relating to the type of test machine needed to process the job. The "submit-job" packet may also contain the location of the test and any associated archive in the library 21, the operating system needed for the test machine 23, the type of graphics devices needed to perform the test, and the date and time at which the job is to be discarded if it has not yet been executed. When the dispatcher 17 receives the "submit-job" packet from the requester 13, the dispatcher 17 decodes the request and sends an "acknowledge" packet to the requester 13 which contains a job identification indication, which is used by the requester for any query requests for information relating to the job, such as the status of the job.

Upon receiving the "submit-job" packet, the dispatcher 17 assigns a priority to the job, as indicated at block 37. The dispatcher 17 then determines whether the job is to be processed immediately, as indicated at block 39. If the job is to be processed immediately, then the process proceeds to block 42 where it is determined whether there are any test machines capable of performing the job that have the necessary operating system and which are not already processing jobs. If it is determined at block 39 that it is not yet time to process the job, the job is added to the job list and the time is set for the dispatcher 17 to wake up and process the job, as indicated at block 40. When it is determined that it is time to process the job, as indicated at block 41, the process proceeds to block 42.

Blocks 42, 43, and 45 represent parsing functions performed in accordance with the scheduling method. At block 42 it is determined whether there are any test machines capable of performing the job which have the necessary operating system for the job and which are not already processing jobs. The dispatcher 17 analyzes the machines list and the jobs list to determine if there are any test machines capable of processing the job which have the necessary operating system and which are not already processing other jobs. If so, those test machines are awakened by the dispatcher 17, as indicated by block 44. Once the test machines are awakened, if they are available for processing a job, they will send "available" packets to the dispatcher, as discussed in detail below.

If at block 42 it is determined that there are no test machines that are capable of processing the job which have the necessary operating system and which are not already processing jobs, the process proceeds to block 43. It is then determined whether there are any test machines capable of processing the job that are not already processing jobs, regardless of whether those test machines have the appropriate operating systems installed on them. If so, the process proceeds to block 44 where those test machines are awakened so that they can begin sending available packets to the dispatcher to request work.

If at block 43 it is determined that there are no test machines capable of processing the job that are not already processing jobs, it is then determined at block 45 whether there are any test machines capable of processing the job which are processing background jobs, which correspond to the lowest priority jobs. If it is determined at block 45 that there are test machines capable of processing the job which are processing background jobs, the dispatcher 17 kills the lowest priority background job, as indicated at block 46. The current job is then sent to the test machine that was processing the lowest priority background job, as indicated at block 47. If at block 45 it is determined that there are no test machines capable of processing the job that are processing background jobs, the process stops.

Figure 4:
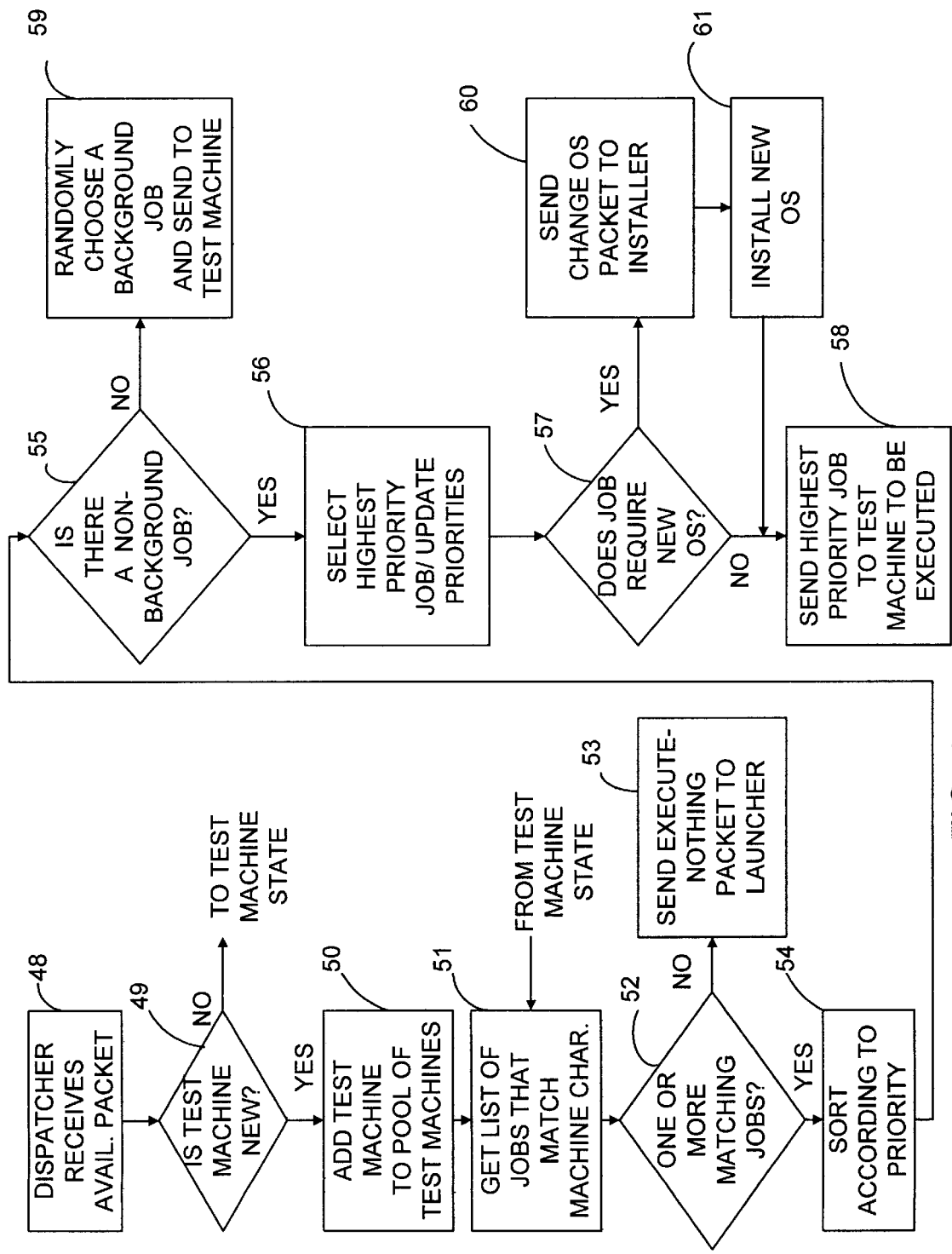

FIG. 4 is a flow chart depicting the interactions between the launcher 18 of a test machine 4 and one of the dispatchers 17 in accordance with the scheduling method of the present invention. FIG. 4 demonstrates the process of prioritizing jobs and selecting an available test machine 4 to process a non-background job which may or may not require that a new operating system be installed on the selected test machine 4. The launcher 18 is a daemon which constitutes the interface between the dispatcher 17 and the test machine 4 and between the library 21 and the test machine 4. When a launcher is installed on a test machine, the launcher will contain a list of the IP addresses of the dispatchers with which the launcher may communicate. When a test machine is available, the launcher of the test machine will advertise the test machine as available by sending "available" packets to the dispatchers on the list in a round robin fashion. In order to allow test machines to be reserved, or checked out, a dispatcher can command a test machine to stop advertising itself as being available.

The launcher 18 prepares the test machine 4 to perform a test, causes the test machine 4 to execute the test, and then leaves the test machine 4 in a predetermined state for receiving the next job. The launcher 18 running on a test machine 4 determines when the test machine 4 is available to execute a job. Once the test machine 4 becomes available, the launcher 18 sends an "available" packet to the dispatcher 17. The "available" packet preferably comprises the IP address of the test machine which sent the packet, information regarding the test machine type, information regarding the graphics device comprised by the test machine, and information regarding the type of OS running on the test machine 4. The "available" packet preferably also contains information relating to whether the test machine 4 can be cold installed, i.e., whether a new operating system can be installed on the test machine 4 by installer 1. The "available" packet may also contain a list of users or a list of groups of users who are allowed to use that particular test machine 4.

When the dispatcher 17 receives an "available" packet from one of the launchers, as indicated by block 48, the dispatcher determines whether the test machine is a new test machine to be added to the test machine pool or whether it has previously been added to the test machine pool, as indicated by block 49. If the test machine has previously been added to the test machine pool, the process proceeds to the test machine state (not shown). Generally, in the test machine state, it is determined whether the test machine which sent the "available" packet is currently executing a job and, if so, whether the test machine had a new operating system installed on it or whether the test machine is executing a job that did not complete normally. If it is determined that the test machine is executing a job that did not complete normally, the job is marked as not executed so that it can be dispatched again and the process exits from the test machine state and returns to block 51.

If upon entering the test machine state, it is determined that the test machine which sent the "available" packet had an operating system installed thereon, then the job which caused the operating system to be installed is sent to the launcher which sent the "available" packet to be processed by that test machine.

If at block 49 it is determined that the test machine is new, then the new test machine is added to the pool of test machines and the test machines file is updated, as indicated at block 50. At block 51, the dispatcher 17 determines whether there are any jobs on the job list that match the characteristics of the test machine which sent the "available" packet, as indicated at block 52. If one or more jobs match the test machine characteristics, the matching jobs are sorted according to priority, as indicated by block 54. If at block 52 it is determined that there are no jobs which match the test machine characteristics, the dispatcher 17 sends an "execute-nothing" packet to the launcher which sent the "available" packet, as indicated at block 53.

Once the jobs have been sorted according to priority, the dispatcher 17 determines whether any of the matching jobs are non-background jobs, as indicated by block 55. If it is determined that none of the jobs are non-background jobs, meaning that only background jobs were found that match the test machine characteristics, the dispatcher 17 randomly selects one of the background jobs and sends it to the test machine, as indicated by block 59. If at block 55 it is determined that one or more of the matching jobs are non-background jobs, the dispatcher 17 selects the job with the highest priority and updates the priorities of the non-background jobs that were not selected, as indicated by block 56. Once the highest priority non-background job has been selected, the dispatcher 17 determines whether the job will require that a new operating system be installed on the test machine which sent the "available" packet, as indicated by block 57. If a new operating system is required, the dispatcher 17 sends a "change OS" packet to the installer 1, as indicated by block 60. The installer 1 then causes a new operating system to be installed on the test machine, as indicated by block 61. The job is then sent to the test machine for processing, as indicated by block 58. If it is determined at block 57 that the job does not require that a new operating system be installed on the test machine, the dispatcher 17 sends the job to the test machine for processing, as indicated by block 58.

In accordance with the preferred embodiment, each installer 1 contains a list of the dispatchers 17 with which it can communicate. Each installer 1 will also contain a list of the test machines 4 which it is allowed to configure and/or install. The installer 1 sends this list to the dispatchers 17 at a periodic rate so that the dispatchers 17 will know the installers 1 with which they are allowed to communicate. This list informs the installer 1 which test machines 4 it can interface with through the RS-232 ports of the test machines. Once an installer 1 is activated, it will identify itself to all dispatchers 17 and then wait for requests from the dispatchers 17. Requests sent from the dispatchers 17 to the installers 1 will be sent in packets in accordance with the communications protocol of the present invention.

When the installer 1 receives a request from a dispatcher 17 to configure or install an OS on a test machine 4, the installer 1 will send commands over the Internet to the multiplexer/demultiplexer 2, which demultiplexes the commands and inputs them into the RS-232 port of the correct test machine. When the command is received by the test machine 4, the boot ROM on the test machine will output requests to its RS-232 port which will be multiplexed by multiplexer/demultiplexer 2 and sent to the installer 1. The installer 1 and the test machine 4 will communicate back and forth in a manner analogous to the manner in which a user inputting data into the console of a computer replies to the boot ROM prompts sent to the display to configure the boot ROM settings and install an operating system. In accordance with the preferred embodiment of the present invention, when the installer 1 is instructed by the dispatcher 17 to install an OS on a test machine 4, the installer 1 calls the installation script. This script is provided with the name and IP address of the test machine to be installed, the OS version and cycle to be installed, and a dispatcher IP address. The script then causes the OS to be installed on the selected test machine by using a particular configuration file obtained by the installer 1.

Once the boot ROM settings have been configured and the OS has been installed on a test machine 4, the launcher 18 is installed on the test machine 4 by the installer 1. Although the launchers 18 are capable of communicating with more than one dispatcher 17, the launchers 18 only communicate with the dispatchers 17 one at a time and in a round robin sequence. Therefore, the first dispatcher 17 which is contacted by the launcher 18 to request work is the dispatcher 17 which initiated the installment. If that dispatcher 17 does not have a job for the test machine 4 to execute, the launcher 18 moves to the next dispatcher 17 in the sequence to request work.

Figure 5:
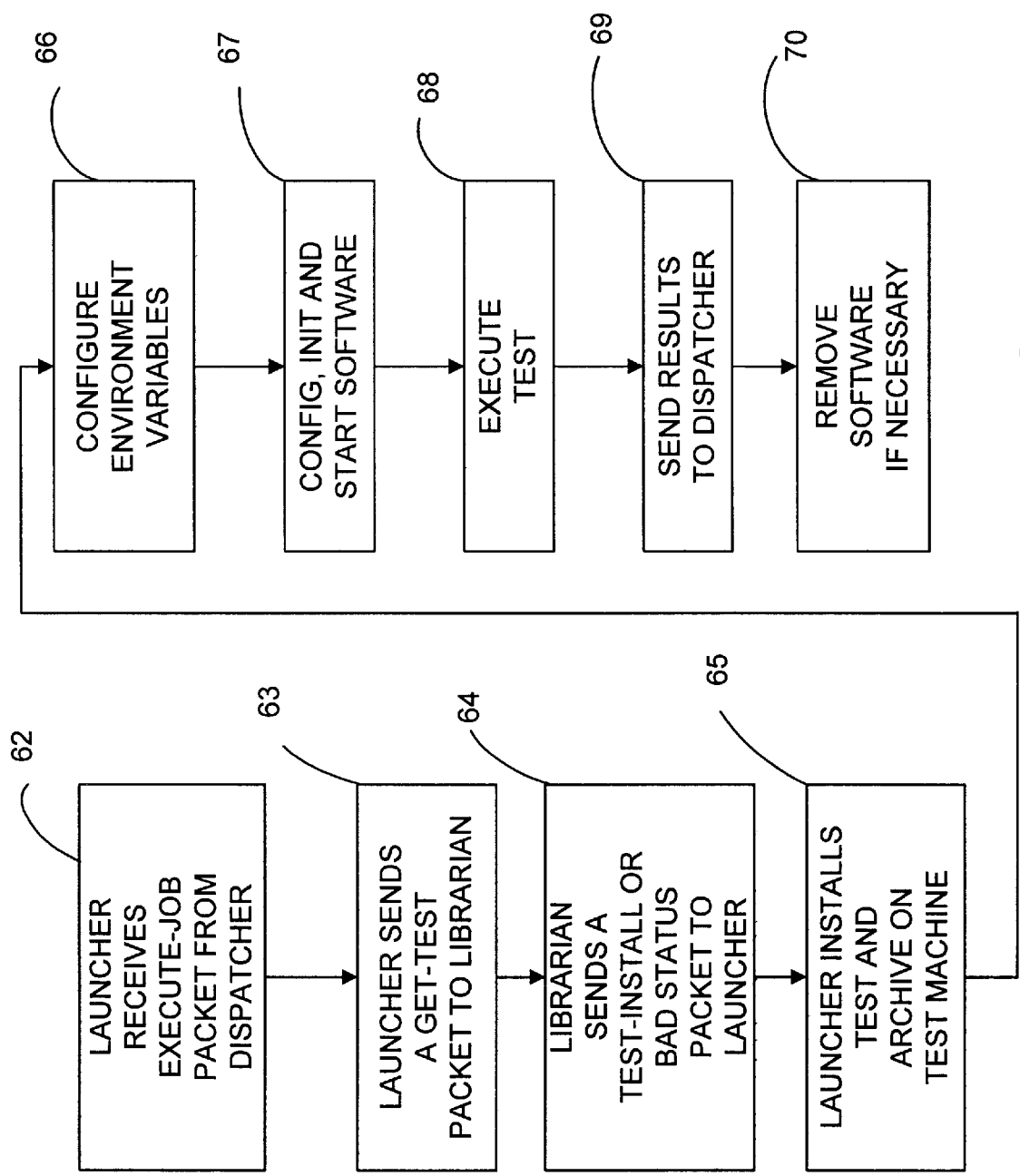
FIG. 5 is a flow chart demonstrating the interactions between the dispatcher and the launcher of the automated testing system illustrated in FIG. 2.

FIG. 5 illustrates a flow chart which generally describes the functions of the launcher 18 upon receiving an "execute-job" packet from the dispatcher 17. The "execute-job" packet comprises a job-ID of the test to be performed, indicia identifying graphics to be tested by the test machine, and the IP address of the test machine. Upon receiving an "execute-job" packet from the dispatcher 17, as indicated by block 62, the launcher 18 sends a "get-test" packet to the librarian, as indicated at block 63. The librarian is a daemon that controls the operations of library 21. The "get-test" packet comprises the test name and version, the archive version, and the IP address of the library 21. In reply to the librarian receiving the "get-test" packet, the library 21 sends a "test-install" packet to the launcher 18, as indicated at block 65. Alternatively, instead of sending the "test-install" packet to the launcher 18, the librarian may send a "status" packet to the launcher 18 indicating that the test requested is unavailable or cannot be sent. This "status" packet will comprise the IP address of the test machine 4, the current date and time, and a "bad" status indication.

As stated above, the launcher 18 installs the test software, configures the environment variables that affect the test, and configures, initializes, and starts the test software. The "test-install" packet sent by the librarian to the launcher 18 includes instructions that command the launcher 18 to perform all of these tasks illustrated by blocks 65–67. Once the test and any associated archives have been installed and configured, the launcher 18 will command the test machine 4 to execute the test, as indicated at block 68. Once the test is complete, the launcher sends the results of the test to the dispatcher 17, as indicated at block 69, and removes software or performs any other actions necessary to leave the test machine in a predetermined state for receiving the next job, as indicated at block 70.

It will be apparent to those skilled in the art that the operations described above with respect to FIGS. 1–5 are merely intended to demonstrate the preferred embodiments of the present invention and the preferred functionalities of the different components of the present invention. It will be apparent to those skilled in the art that other features can be added if so desired. It will also be apparent to those skilled in the art that although certain components of the present invention have been discussed as being implemented in software, these components may also be implemented in hardware and/or in a combination of hardware and software if so desired. Likewise, the components of the present invention which have been discussed as being implemented in hardware may also be implemented in software and/or in a combination of hardware and software. It will be apparent to those skilled in the art that other modifications may be made to the installer and to the automated testing system of the present invention discussed above which are within the spirit and scope of the present invention.

What is claimed is:

1. An installer machine for automatically installing an operating system on a computer which is in communication with the installer machine via a serial port of the computer, the installer machine comprising:

a first interface which receives instructions relating to an installation job to be performed;

a second interface which receives data output from the serial port of the computer and which outputs installation commands to be sent to the serial port of the computer; and a processor which receives data from the second interface relating to data sent from the serial port of the computer and which generates the installation commands in response to the data received by the processor, the processor outputting the installation commands to the serial port of the computer via the second interface of the installer machine, wherein at least one of said installation commands output to the serial port of the computer via the second interface of the installer machine is a start-sequence command which causes the computer to enter a boot ROM memory portion of a memory device comprised in the computer thereby causing the computer to output said data from the serial port to the installer machine, and wherein the installation commands received by the serial port of the computer other than the start-sequence command cause an operating system to be automatically installed on the computer.

2. The installer machine of claim 1, wherein the processor is running an installation program which utilizes a script to generate the installation commands, the installer selecting a script to be utilized based on the instructions received by the first interface, the script selected corresponding to a particular type of operating system to be installed.

3. The installer machine of claim 1, wherein the installer machine is capable of automatically installing operating systems on a plurality of computers, each of the computers being in communication with the installer machine via a serial port of the computer, the second interface of the installer machine being in communication with a multiplexer/demultiplexer device which is connected to the serial port of each computer, wherein when the first interface of the installer machine receives instructions relating to an installation job, the installer machine determines which computer is to have an operating system installed on it and sends the installation commands to the multiplexer/demultiplexer device along with an address of a port of the multiplexer/demultiplexer device to which the selected computer is connected to thereby cause an operating system to be installed on the selected computer.

4. The installer machine of claim 3, wherein the processor is running an installation program which utilizes a script to generate the installation commands, wherein the installer selects a script to be utilized based on the instructions received by the first interface, the script selected corresponding to a particular type of operating system to be installed.

5. The installer machine of claim 4, wherein the computers are test machines and wherein the installer machine is incorporated into an automated testing system for installing operating systems on a plurality of the test machines, the multiplexer/demultiplexer device being connected to a serial port of each of the test machines, wherein when the first interface of the installer machine receives instructions relating to an installation job, the installer machine determines which test machine is to have an operating system installed on it and sends the installation commands to the multiplexer/demultiplexer device along with an address of a port of the multiplexer/demultiplexer device to which the selected test machine is connected.

6. The installer machine of claim 5, wherein the multiplexer/demultiplexer device and the installer machine are in communication with each other via the Internet, the installer machine and the multiplexer/demultiplexer device each having an Internet Protocol address, the installer machine identifying a test machine to be installed by the Internet Protocol address of the multiplexer/demultiplexer and by the port to which the test machine to be installed is connected.

7. The installer machine of claim 1, wherein the installer machine is incorporated into an automated testing system for installing operating systems on a plurality of test machines, the second interface of the installer machine being in communication with a multiplexer/demultiplexer device which is connected to a serial port of each of the test machines, wherein when the first interface of the installer machine receives instructions relating to an installation job, the installer machine determines which test machine is to have an operating system installed on it and sends the installation commands to the multiplexer/demultiplexer device along with an address of a port of the multiplexer/demultiplexer device to which the selected test machine is connected to thereby cause an operating system to be installed on the selected computer.

8. The installer machine of claim 7, wherein the multiplexer/demultiplexer device and the installer machine are in communication with each other via the Internet, the installer machine and the multiplexer/demultiplexer device each having an Internet Protocol address, the installer machine identifying a test machine to be installed by the Internet Protocol address of the multiplexer/demultiplexer and by the address of the port to which the test machine to be installed is connected.

9. An installer machine for automatically installing an operating system on a computer which is in communication with the installer machine via a serial port of the computer, the installer machine comprising:

means for receiving instructions relating to an installation job to be performed;

means for receiving data output from the serial port of the computer and for sending installation commands to the serial port of the computer; and means for processing the data received by the second interface to generate the installation commands, the means for processing outputting the generated installation commands to the serial port of the computer via the second interface of the installer machine, wherein at least one of said installation commands output to the serial port of the computer via the second interface of the installer machine is a start-sequence command which causes the computer to enter a boot ROM memory portion of a memory device comprised in the computer thereby causing the computer to output said data from the serial port to the installer machine, and wherein the installation commands received by the serial port of the computer other than the start-sequence command cause an operating system to be automatically installed on the computer.

10. The installer machine of claim 9, wherein the means for processing is running an installation program which utilizes a script to generate the installation commands, wherein the installer selects a script to be utilized based on the instructions received by the means for receiving instructions, the script selected corresponding to a particular type of operating system to be installed.

11. The installer machine of claim 10, wherein the installer machine is capable of automatically installing operating systems on a plurality of computers, each of the computers being in communication with the installer machine via a serial port of the computer, the means for receiving data being in communication with a means for multiplexing and demultiplexing the data sent to and from the installer machine to and from the computers, the means for multiplexing and demultiplexing data being connected to the serial port of each computer, wherein when the means for receiving receives instructions relating to an installation job, the installer machine determines which computer is to have an operating system installed on it and sends the installation commands to the means for multiplexing and demultiplexing data along with an address of a port of the means for multiplexing and demultiplexing data to which the selected computer is connected to thereby cause an operating system to be installed on the selected computer.

12. The installer machine of claim 11, wherein the installer machine is incorporated into an automated testing system for installing operating systems on a plurality of test machines, each test machine constituting one of the computers.

13. The installer machine of claim 12, wherein the means for multiplexing and demultiplexing data and the installer machine are in communication with each other via the Internet, the installer machine and the means for multiplexing and demultiplexing data each having an Internet Protocol address, the installer machine identifying a test machine to be installed by the Internet Protocol address of the means for multiplexing and demultiplexing data and by the address of the port of the means for multiplexing and demultiplexing data to which the test machine to be installed is connected.

14. A method for automatically installing an operating system on a computer which is in communication with an installer machine via a serial port of the computer, the method comprising the steps of:

receiving instructions at a first interface of the installation machine, the instructions relating to an installation job to be performed;

sending a first command from a second interface of the installation machine to the serial port of the computer which causes the computer to enter a boot block portion of a memory device comprised in the computer, the first command causing the computer to prepare to load a new operating system onto the computer;

receiving data output from the serial port of the computer at a second interface of the installation machine, the data output from the serial port of the computer corresponding to a series of questions to which replies must be made in order for an operating system to be loaded onto the computer;

processing the data received at the second interface in a processor of the installation machine to generate installation commands which correspond to the replies; and sending the installation commands to the serial port of the computer from the second interface of the installation machine to cause an operating system to be loaded onto the computer.

15. The method of claim 14, wherein the processor is running an installation program which utilizes a script to generate the installation commands, wherein the installer selects a script to be utilized based on the instructions received by the first interface, the script selected corresponding to a particular type of operating system to be installed.

16. The method of claim 15, wherein operating systems are automatically installed on a plurality of computers, each of the computers being in communication with the installer machine via a serial port of the computer, wherein the second interface of the installer machine is in communication with a multiplexer/demultiplexer device which is connected to the serial port of each computer, wherein the instructions received at the first interface inform the installer machine which of the computers has been selected to have an operating system installed on it, and wherein the installation commands sent from the second interface are sent to the multiplexer/demultiplexer device along with an address of a port of the multiplexer/demultiplexer device to which the selected computer is connected to thereby cause an operating system to be installed on the selected computer.

17. The method of claim 16, wherein the installer machine is incorporated into an automated testing system for installing operating systems on a plurality of test machines, each of the computers constituting a test machine.

18. The installer machine of claim 17, wherein the multiplexer/demultiplexer device and the installer machine are in communication with each other via the Internet, the installer machine and the multiplexer/demultiplexer device each having an Internet Protocol address, the installer machine identifying a test machine to be installed by the Internet Protocol address of the multiplexer/demultiplexer and by the address of the port to which the test machine to be installed is connected.

* * * * *

UNITED STATES PATENT AND TRADEMARK OFFICE
CERTIFICATE OF CORRECTION

PATENT NO.      : 6,094,531
DATED           : July 25, 2000
INVENTOR(S)     : Michael Allison et al.

It is certified that error appears in the above-identified patent and that said Letters Patent is hereby corrected as shown below:

<u>Title page,</u>
Item [54], in the Title, after "SYSTEMS" insert -- ON --
Item [22], Filed: delete "August" and insert therefor -- September --

<u>Drawings,</u>
Fig. 3, delete arrowhead on left side of box 42.

Signed and Sealed this

Second Day of July, 2002

Attest:

JAMES E. ROGAN
Attesting Officer          Director of the United States Patent and Trademark Office